United States Patent Office 2,842,963
Patented July 15, 1958

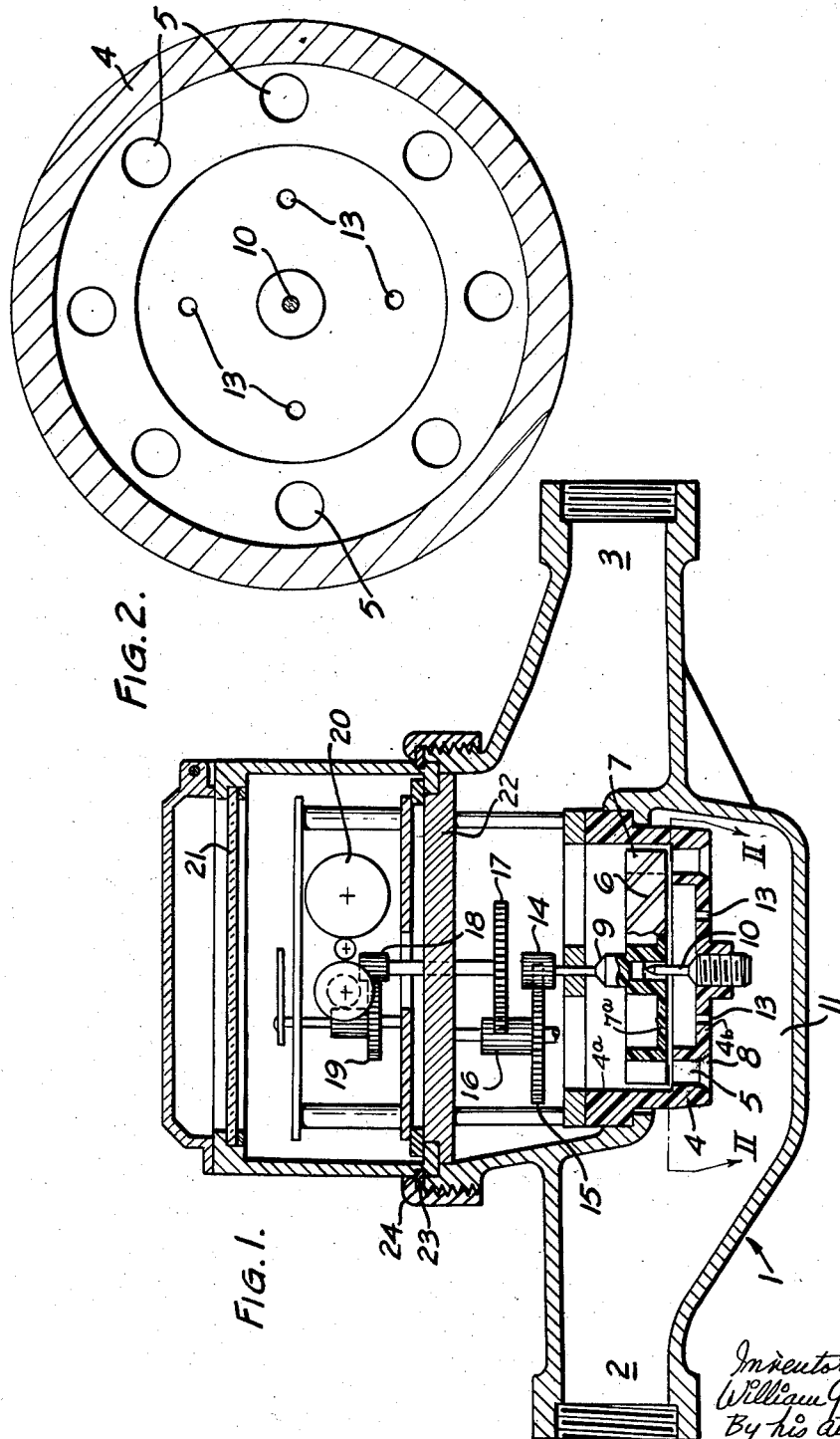

2,842,963

ROTARY LIQUID METER

William Guy Ardley, London, England, assignor to George Kent Limited, London, England, a company of Great Britain Application June 7, 1954, Serial No. 434,906

Claims priority, application Great Britain June 15, 1953

3 Claims. (Cl. 73—231)

The invention comprises an improved liquid meter of the type wherein the flow of liquid through the working chamber of the meter passes through a ring of peripheral blades carried by a rotor which is thereby rotated and whose rotation is transmitted through gearing or other means to a counter mechanism.

According to the invention, the working chamber of a liquid meter of this type is constructed so that the flow of liquid to the rotor blades is confined to a plurality of jets. Thus there may be interposed between the liquid inlet of the meter and the rotor a generally cup-shaped block with holes bored in it to provide passages for the liquid jets. The base of the block may carry a bearing for an end of a spindle on which the rotor is mounted.

The dimensions of the rotor blades and the number and cross-sectional areas of the liquid jets may be so selected that the rotor experiences a downward thrust under the action of liquid flow. This downward thrust is preferably counterbalanced by an upward thrust so that the rotor may be retained in a substantially floating condition. Thus, outside of the base of the block there is a space in communication with the liquid inlet and this space may be placed in restricted communication with the inside of the block in order to provide an upward pressure to balance the downward thrust on the rotor. The liquid passages may be outwardly flared at the base of the block.

The working chamber is preferably retained in position in a casing by means of a member adapted to shear at a predetermined stress, whereby freezing of the liquid within the meter causes the said member to shear and the pressure within the meter to be relieved. The rotor and the gearing elements within the working chamber whereby the rotation of the rotor is transmitted to the counter mechanism may be made of resilient material.

The invention is illustrated by way of example in the accompanying drawings in which Figure 1 is a vertical section through a water meter in accordance with the invention, and Figure 2 is an enlarged view taken on the line II—II of Figure 1.

Referring to the drawings, a water meter is shown in which water in its passage through a casing 1 from an inlet 2 to an outlet 3 streams through a working chamber defined by the interior of a generally cup-shaped block part 4 which is preferably made of a nylon filled phenolic plastic. The block 4 includes a hollow cylindrical portion 4ª and a base portion 4ᵇ which is bored to provide eight spaced-apart water passages 5, so disposed that jets of water through the passages will impinge upon a registering ring of peripheral blades 6 carried by a rotor 7 disposed within the block 4 and comprising a solid inner portion 7ª surrounded by the blades 6. The water passages 5 are outwardly flared as at 8. The blades 6 are set at an angle of 45° with respect to the top and bottom surfaces of the rotor. It will be appreciated, however, that the blades may be set at angles other than 45°.

The rotor, which is fast with a spindle 9, is rotatably mounted upon a bearing member 10 screwed into the base of the block 4. Beneath the said base there is a space 11 in communication with the inlet 2 and this space is placed in restricted communication with the inside of the block by means of four vent holes 13 which extend through the base portion 4ᵇ adjacent to the rotor solid inner portion 7ª to provide communication between the inlet 2 and the cylindrical portion 4ª of the part 4 at a radial distance from the axis of rotation less than the radially inner extremities of the blades 6. The purpose of these holes is to tend to balance a downward pressure on the rotor whereby the rotor is maintained in a substantially floating condition.

The maintenance of the rotor in a substantially floating condition is assisted by making it of nylon or other material, whose specific gravity is in the neighborhood of unity. The material chosen should be capable of being easily moulded, should be light and slightly resilient, and should be able to withstand hot watere. Since the extent of the peripheral edges of the blades 6 parallel to the axis of the cylindrical portion 4ª of the block 4 is less than the extent of the cylindrical portion 4ª parallel to the axis, the axial length of the cylindrical portion inner wall at any time immediately surrounding and adjacent to the blade peripheral edges will be constant irrespective of floating of the rotor in the direction of its axis of rotation.

The area of through-way through the rotor should preferably be at least 1.75 times as great as the area of the total through-way through the water passages 5. A meter, having an especially satisfactory characteristic, may be provided by making the rotor $1^{19}/_{32}''$ in diameter and $½''$ thick. The block 4 for use with this rotor preferably has eight water passages 5 of $1^{3}/_{64}''$ diameter equally spaced apart about a circle of $1\frac{3}{8}''$ diameter. If the rotor and the block 4 have dimensions such as given above, it will be found that the rotor experiences a downward thrust under the action of liquid flow.

The spindle 9 carries a pinion 14 which meshes with a gear 15 on which is immovably mounted a pinion 16. The pinion 16 meshes with a gear 17. The pinions 14, 16 and gears 15, 17 are preferably of a slightly resilient material such as nylon. The gear 17 has a drive connection with a pinion 18 and gear 19. The gear 19 is in drive connection with a cyclometer type counter 20 which may be viewed through an inspection plate of glass or other transparent material 21 positioned in the counter-housing of the casing 1.

The cover 22 of the working chamber is connected to the casing 1 through the intermediary of a shear ring 23 clamped to the casing 1 by a clamp ring 24. The shear ring 23 is in two semi-circular parts which are retained in position in corresponding grooves in the ring 24 and counterhousing 25 on casing 1. If the liquid within the meter freezes, an upward force is exerted on the working chamber and, at a certain predetermined stress, the ring 23 shears. This allows the working chamber to rise with respect to the casing 1, thereby avoiding damage to the meter. The rotor and the gearing elements within the working chamber are, as stated above, of a slightly resilient material such as nylon. This resilience therefore permits the said rotor and gearing elements to deform under pressure and to recover their original shape on thawing.

When the meter has thawed out, the meter can be re-assembled by removing the clamp ring 24, inserting a new shear ring 23, pushing the working chamber back into the casing and fixing the working chamber in position therein by screwing the clamp ring 24 down onto the shear ring 23.

What is claimed is:

1. In a liquid meter, a casing having an inlet and an outlet; a part in said casing between said inlet and said outlet including a hollow cylindrical portion opening toward said outlet and a base portion adjacent to said inlet and extending between said inlet and said cylindrical portion, said base portion being formed with a plurality of passages extending from said inlet to within said cylindrical portion for directing liquid to flow in a plurality of jets into said cylindrical portion and toward said outlet; a rotor having a solid inner portion and an outer peripheral ring of blades registering with said passages; bearing means fixed with respect to said casing and mounting said rotor to rotate within and about the axis of said cylindrical portion with freedom to float in the direction of said axis with the peripheral outer edges of said blades surrounded by and adjacent to the internal wall of said cylindrical portion, the extent of said blade peripheral edges parallel to the axis of said cylindrical portion being less than the extent of said cylindrical portion parallel to said axis whereby the axial length of said cylindrical portion inner wall at any time immediately surrounding and adjacent to said blade peripheral edges will be constant irrespective of floating of said rotor in the direction of said axis, the total cross sectional area between said blades transverse to said axis being at least 1.75 times as great as the total cross sectional area of said passages, said base portion being apertured to provide restricted communication between said inlet and said cylindrical portion at a radial distance from said axis of rotation less than the radially inner extremities of said blades and adjacent to said rotor solid inner portion for controlling the pressure acting on said rotor in the direction of flow through said cylindrical portion to be sufficient to maintain said rotor in substantially floating condition axially relative to said bearing means; a counter mechanism; and means for transmitting drive from said rotor to said counter mechanism.

2. In a liquid meter, a casing having an inlet and an outlet; a part in said casing between said inlet and said outlet including a hollow cylindrical portion with its axis vertical opening toward said outlet and a base portion adjacent to said inlet and extending between said inlet and said cylindrical portion, said base portion being formed with a plurality of passages extending from said inlet to within said cylindrical portion for directing liquid to flow in a plurality of jets into said cylindrical portion and toward said outlet; a rotor having a solid inner portion and an outer peripheral ring of blades registering with said passages; bearing means fixed with respect to said casing and mounting said rotor to rotate within and about the axis of said cylindrical portion with freedom to float vertically with the peripheral outer edges of said blades surrounded by and adjacent to the internal wall of said cylindrical portion, the vertical extent of said blade peripheral edges being less than the vertical extent of said cylindrical portion whereby the axial length of said cylindrical portion inner wall at any time immediately surrounding and adjacent to said blade peripheral edges will be constant irrespective of vertical floating of said rotor in the direction of said axis, the total horizontal cross sectional area between said blades being at least 1.75 times as great as the total horizontal cross sectional area of said passages, said base portion being apertured to provide restricted communication between said inlet and said cylindrical portion at a radial distance from said axis of rotation less than the radially inner extremities of said blades and adjacent to said rotor solid inner portion for controlling the pressure acting vertically on said rotor to be sufficient to maintain said rotor in substantially floating condition axially relative to said bearing means; a counter mechanism; and means for transmitting drive from said rotor to said counter mechanism.

3. A liquid meter construction as set forth in claim 2 in which said rotor has a specific gravity of approximately unity.

References Cited in the file of this patent

UNITED STATES PATENTS

| 16,983 | Leopold | Apr. 7, 1857 |
| 752,326 | Braun | Feb. 16, 1904 |
| 867,766 | Thorp | Oct. 8, 1907 |
| 998,089 | Hansen | July 18, 1911 |
| 1,016,934 | Charlton | Feb. 13, 1912 |

FOREIGN PATENTS

| 6,017 | Great Britain | 1903 |
| 151,389 | Germany | May 14, 1904 |
| 560,155 | Germany | Sept. 29, 1932 |
| 741,503 | France | Dec. 12, 1932 |
| 691,780 | Great Britain | May 20, 1953 |